(12) United States Patent
Sherrer

(10) Patent No.: US 7,078,671 B1
(45) Date of Patent: Jul. 18, 2006

(54) SILICON OPTICAL MICROBENCH DEVICES AND WAFER-LEVEL TESTING THEREOF

(75) Inventor: David W. Sherrer, Blacksburg, VA (US)

(73) Assignee: Shipley Company, L.L.C., Marlborough, MA (US)

(*) Notice: Subject to any disclaimer, the term of this patent is extended or adjusted under 35 U.S.C. 154(b) by 327 days.

(21) Appl. No.: 10/214,433

(22) Filed: Aug. 6, 2002

Related U.S. Application Data
(60) Provisional application No. 60/310,378, filed on Aug. 6, 2001.

(51) Int. Cl.
*H01J 3/14* (2006.01)

(52) U.S. Cl. ........................ 250/216; 250/239
(58) Field of Classification Search ............... 250/216, 250/239, 227.11, 227.22, 227.21; 385/49, 385/50, 15, 18, 88; 324/753, 755, 765
See application file for complete search history.

(56) References Cited

U.S. PATENT DOCUMENTS

| | | |
|---|---|---|
| 4,495,400 A | 1/1985 | Thompson |
| 4,807,238 A | 2/1989 | Yokomori |
| 4,897,711 A | 1/1990 | Blonder et al. |
| 5,071,213 A | 12/1991 | Chan |
| 5,163,113 A | 11/1992 | Melman |
| 5,263,111 A | 11/1993 | Nurse et al. |
| 5,327,443 A | 7/1994 | Tanaka et al. |
| 5,344,746 A | 9/1994 | Vettiger et al. |
| 5,384,872 A | 1/1995 | Jacobs-Cook et al. |
| 5,479,426 A | 12/1995 | Nakanishi et al. |
| 5,479,540 A | 12/1995 | Boudreau et al. |
| 5,500,540 A | 3/1996 | Jewell et al. |
| 5,563,901 A | 10/1996 | Otoma et al. |
| 5,696,862 A | 12/1997 | Hauer et al. |
| 5,898,803 A | 4/1999 | Mueller-Fiedler et al. |
| 5,912,872 A | 6/1999 | Feldman et al. |
| 6,062,741 A | 5/2000 | Tachigori |
| 6,081,638 A | 6/2000 | Zhou |
| 6,389,202 B1 * | 5/2002 | Delpiano et al. ............. 385/49 |
| 6,495,382 B1 * | 12/2002 | Yap ............................ 438/24 |
| 6,746,782 B1 | 6/2004 | Zhao et al. |
| 2002/0105979 A1 | 8/2002 | Cappuzzo |

FOREIGN PATENT DOCUMENTS

| | | |
|---|---|---|
| EP | 0 609 062 | 8/1994 |
| GB | 2 312 551 A | 10/1997 |

* cited by examiner

*Primary Examiner*—Que T. Le
(74) *Attorney, Agent, or Firm*—Jonathan D. Baskin (57) ABSTRACT

An optical microbench configured to facilitate wafer-level testing of optoelectronic devices is provided. The optical microbench includes an optoelectronic device mounted to a wafer in which the optical microbench is provided. The optical microbench also includes a beam deflector provided in the wafer and disposed along the optical path of the optoelectronic device. The beam deflector is configured to deflect a portion of the optical path to lie along a direction oriented out of the plane of the wafer. The optical microbench further includes an optical feed-through disposed along the optical path between the optoelectronic device and the beam deflector. The optical feed-through is configured to conduct an optical signal between the beam deflector and the optoelectronic device. A method for testing optoelectronic devices at the wafer level is also provided.

40 Claims, 8 Drawing Sheets

SILICON OPTICAL MICROBENCH DEVICES AND WAFER-LEVEL TESTING THEREOF

RELATED APPLICATIONS

Applicants claim the benefit of priority of U.S. Provisional Application No. 60/310,378, filed on Aug. 6, 2001, the entire contents of which are incorporated herein by reference.

FIELD OF THE INVENTION

The present disclosure relates to a method for testing optoelectronic devices at the wafer level and relates to devices configured to facilitate wafer-level testing prior to being singulated from the wafer.

BACKGROUND OF THE INVENTION

Optoelectronic devices play a crucial role in applications ranging from data communications to consumer electronics, as well as to devices for developing applications, such as optical computing. The ability to manufacture optoelectronic devices efficiently is of critical importance in reaching the low cost targets required for making the devices acceptable for use in such applications. In particular, it is desirable to fabricate as many devices as possible during a single manufacturing process to reduce manufacturing costs. For example, it is highly desirable to fabricate a plurality of devices in parallel at different regions of a wafer. However, fabrication of multiple devices on a single wafer can often make it difficult to test the devices on the wafer before the devices are singulated, because the optical output/input from a first device on the wafer may be blocked by a second device on the wafer, making it difficult for a testing device to receive the optical output/input. The testing of singulated devices, however, can add an unacceptable cost to the fabrication of optoelectronic devices, since each device must be manipulated and tested individually. Therefore, there is a need in the art for technology that would permit wafer-level testing of a plurality of optoelectronic devices.

SUMMARY OF THE INVENTION

The present invention provides an optical microbench suited to testing at the wafer level. The optical microbench includes an optoelectronic device mounted to a wafer in which the optical microbench is provided. The wafer may desirably comprise a single crystalline material, such as single crystal silicon. The optoelectronic device may include one or more of an optical source and a photodetector. The optical microbench also includes a beam deflector provided in the wafer and disposed along the optical path of the optoelectronic device. The beam deflector is configured to deflect a portion of the optical path to lie along a direction oriented out of the plane of the wafer. The optical microbench further includes an optical feed-through disposed along the optical path between the optoelectronic device and the beam deflector. The optical feed-through is configured to conduct the optical signal between the beam deflector and the optoelectronic device. An optional lid may be provided and mounted to the wafer for enclosing the optoelectronic device between the lid and the wafer to provide an optical device package.

In a selected configuration, the optical feed-through may include an optical fiber stub disposed within a feed-through groove formed in the wafer. The feed-through groove may include a {111} crystallographic plane of a single crystalline wafer. In an alternative configuration, the optical feed-through may include a wall section formed in the wafer or the lid. Alternatively, the optical feed-through may include a waveguide formed in the wafer or the lid.

The optical beam deflector may include an end wall of a beam deflection groove formed in a selected surface of the wafer. The beam deflection groove and feed-through groove may be located co-linearly relative to one another. The end wall may be disposed at a selected angle relative to an upper surface of the wafer. For example, for the configuration where the wafer includes a single crystalline material, the end wall may include a {111} crystallographic plane of the wafer.

In accordance with another aspect of the invention, a method is provided for testing an optical device package while the optical device package is attached to a wafer. The method includes the step of providing a wafer which includes a plurality of optical microbenches. The optical microbenches each include an optical semiconductor component mounted to the wafer. The optical microbench also includes a beam deflector provided in the wafer and disposed along the optical path of the optical semiconductor component. The beam deflector is configured to deflect a portion of the optical path to lie along a direction oriented out of the plane of the wafer. The optical microbench further includes an optical feed-through disposed along the optical path between the optical semiconductor component and the beam deflector. The optical feed-through is configured to conduct the optical signal between the beam deflector and the optical semiconductor component. An optical device package is provided on each optical microbench and includes the optical feed-through and optical semiconductor component, along with a lid.

The method also includes the step of providing a testing device. The testing device may include an optical source or a photodetector. The testing device may include a single testing module or may include a plurality of testing modules. The method further includes the step of registering the testing device to a selected optical device package, so that the testing device is able to optically communicate with a selected optical semiconductor component via the associated beam deflector. In the case where the testing device includes a plurality of testing modules, each testing module may be simultaneously registered with a respective optical semiconductor component of a respective optical device package.

The method also includes the steps of activating the testing device and optical semiconductor component. In the case where the testing device includes an optical source, the step of activating the testing device includes the step of supplying electrical energy to the testing device to cause the testing device to emit an optical beam that is directed to the optical semiconductor component by the beam deflector. In such a case, the step of activating the optical semiconductor component includes the step of receiving the optical beam emitted from the testing device and generating an electrical signal in response to the received optical beam.

In the case where the optical semiconductor component includes an optical source, the step of activating the optical semiconductor component includes the step of supplying electrical energy to the optical semiconductor component to cause the optical semiconductor component to emit an optical beam that is directed to the testing device by the beam deflector. In such a case, the step of activating the testing device includes the step of receiving the optical beam emitted from the optical semiconductor component and generating an electrical signal in response to the received optical beam. By analyzing the electrical signal generated by the optical semiconductor component or the testing device the optical device package is tested.

BRIEF DESCRIPTION OF THE DRAWINGS

The foregoing summary and the following detailed description of the preferred embodiments of the present invention will be best understood when read in conjunction with the appended drawings, in which.

DETAILED DESCRIPTION OF THE INVENTION

Referring now to the figures, wherein like elements are numbered alike throughout, an optical microbench 100 in accordance with the present invention is provided. The optical microbench 100 has a configuration that is well-suited for testing while the optical microbench 100 remains attached to a wafer 200 in which the optical microbench 100 is formed. In particular, the configuration of the optical microbench 100 permits multiple such optical microbenches 100 to be fabricated on a single wafer 200 and tested before such microbenches 100 are singulated. The ability to test the optical microbenches 100 at the wafer level is provided by a beam deflector, end wall 117, which directs an optical beam 190 out of the plane of the substrate 110 for optical communication with a testing device 160. Since the optical beam 190 is directed upwardly away from the optical microbench 100, the optical microbench 100 may be tested while multiple such microbenches 100 are connected to one another in wafer form.

Figure 1A:
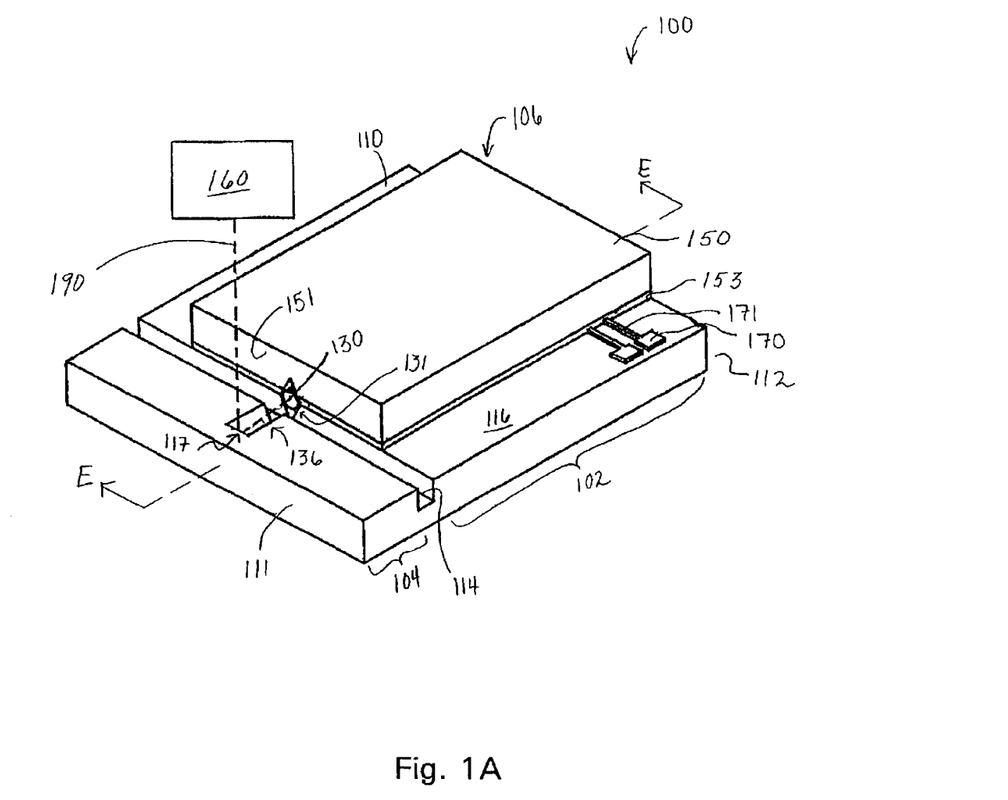
FIG. 1A schematically illustrates a perspective view of an optical microbench having an optical device package and a beam deflector.
Figure 1B:
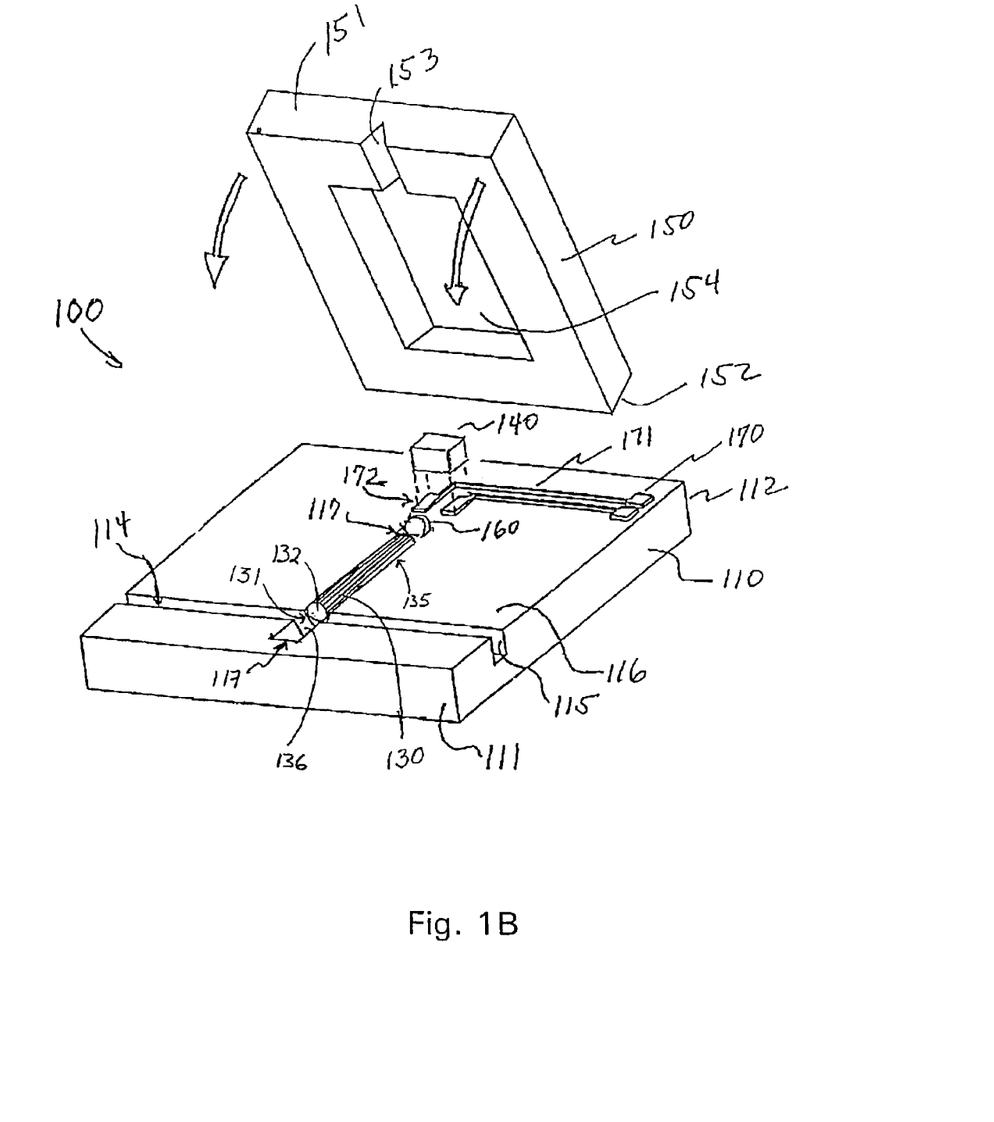
FIG. 1B schematically illustrates an exploded perspective view of the optical microbench shown in FIG. 1A.
Figure 2:
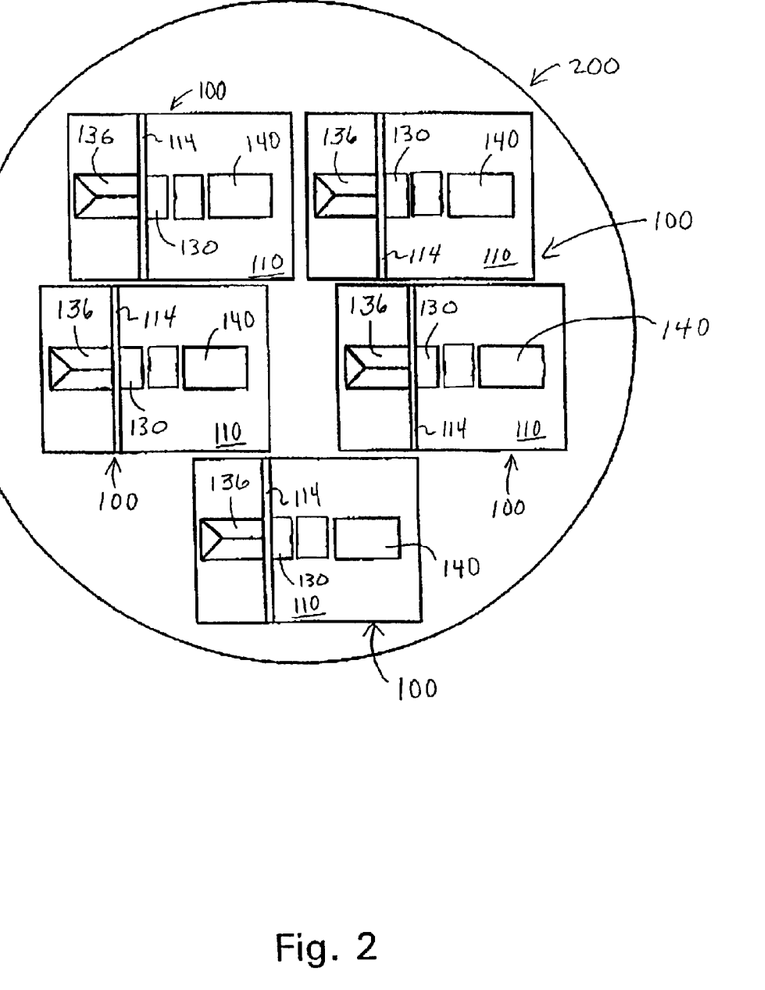
FIG. 2 schematically illustrates a top view of a wafer comprising a plurality of optical microbenches each having a beam deflector, an optical feedthrough, and an optoelectronic device.
Figure 3:
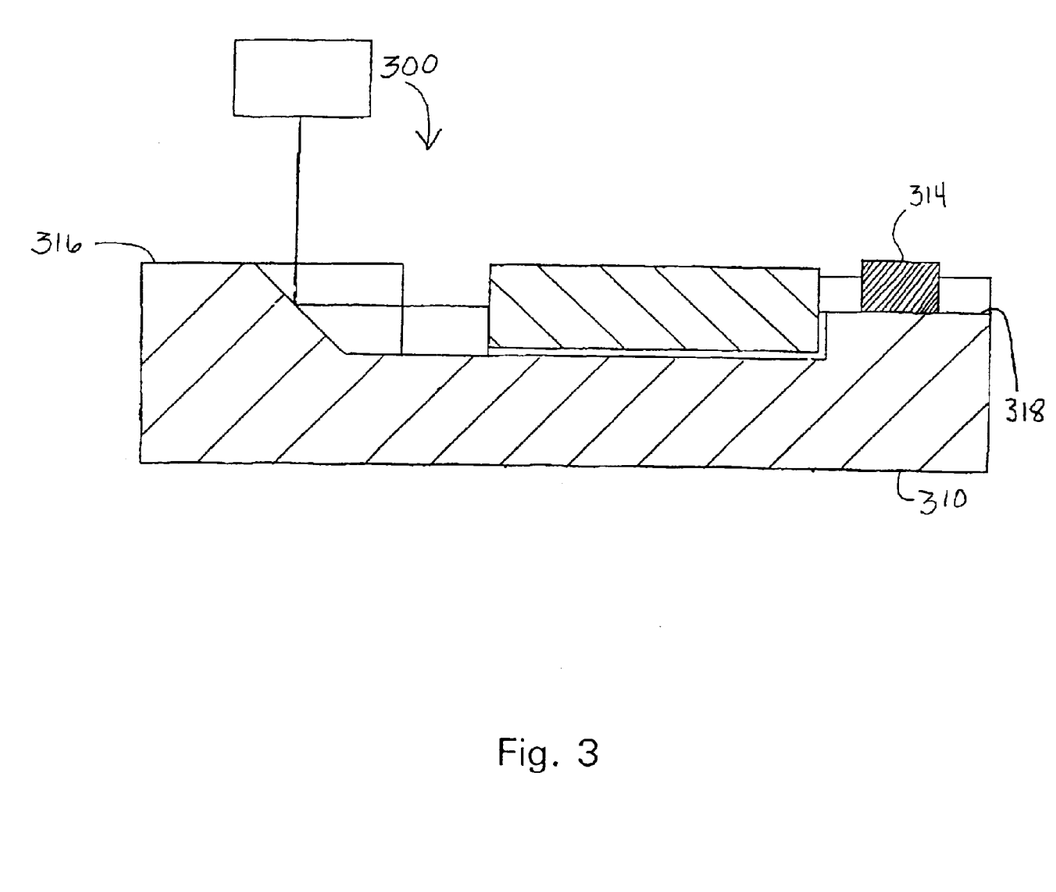
FIG. 3 schematically illustrates another configuration of an optical microbench in accordance with the present invention, shown in a side cross-sectional view taken along the optical axis of the microbench.

Referring to FIGS. 1A, 1B, and 2, an optical microbench 100 is illustrated which comprises a substrate 110. While the substrate 110 is illustrated in FIGS. 1A and 1B as a discrete component, the substrate 110 may be a portion of a wafer 200 on which multiple optical microbenches 100 are provided, as illustrated in FIG. 2. The substrate 110 includes a device portion 102 at which an optical device package 106 is provided. The optical device package 106 comprises at least one optoelectronic device, such as an optical semiconductor component 140, which may be mounted on an upper surface 116 of the substrate 110. The optical semiconductor component 140 may include any suitable semiconductor device for emitting, receiving, or modifying an optical beam such as, a laser diode, a light emitting diode (LED), or a photodetector, for example. In alternative configuration of an optical microbench 300, as shown in FIG. 3, an optical semiconductor component 340 may be provided on an upper surface 318 of the substrate 310 that is recessed relative to the upper surface 316 of the substrate 310.

As shown in FIG. 1B, bonding pads 170 are provided around the peripheral portion of the upper surface 116 of the substrate 110 for supplying an electrical signal to, or receiving an electrical signal from, the optical semiconductor component 140. The bonding pads 170 are electrically connected to the optical semiconductor component 140 by conductive electrical leads 171. The optical semiconductor component 140 is mounted to the ends 172 of leads 171 at the interior of the optical device package 106. The bonding pads 170 and leads 171 may be arranged to provide a common ground plane for all optical semiconductor components 140 provided on the wafer 200.

The optical device package 106 may include a lid 150 for mating to the upper surface 116 of the substrate 110 to enclose the optical semiconductor component 140 between the lid 150 and the substrate 110. The lid 150 may include a recessed area 154 in which the optical semiconductor component 140 is contained. Alternatively or additionally, the substrate 110 may comprise a recessed area in which the optical semiconductor component 140 is disposed, and the lid 150 may be provided with or without a complementary recessed area 154. The lid 150 is positioned on the substrate 110 so that bonding the pads 170 are not covered by the lid 150.

The lid 150 may be adhered to the upper surface 116 of the substrate 110 by a bonding agent 153 such as an epoxy resin, benzocyclobutene resin (BCB), or soldering agents such as solder metal or solder glass frit. Solder glass frit is a low melting point glass such as borate glass, lead zinc borate glass, and the like. Generally, solder glass frit may have a melting point of from about 300° C. to about 800° C., and usually 325° C. to about 500° C. Solder glass frit suitable for use in the present invention is commercially available, for example, from Schott Glass Technologies of Duryea, Pa. The layer of the bonding agent 153 (solder glass, adhesive, etc.) may desirably be selected to be at least as thick as the leads 171, so that the leads 171 may pass under the lid 150 and into the recessed area 154 through the bonding agent 153. Alternatively, the lid 150 may have recesses to accommodate the leads 171.

The lid 150 may be sealed to the upper surface 116 of the substrate 110 to provide a hermetically sealed optical device package 106. Providing a hermetic seal may be desirable, because optical semiconductor devices 140 can be sensitive to environmental conditions. Sealing the optical semiconductor component 140 in a hermetic package can prevent degradation of the optical semiconductor component 140 by atmospheric contaminants such as humidity, dust, and free ions.

Figure 1C:
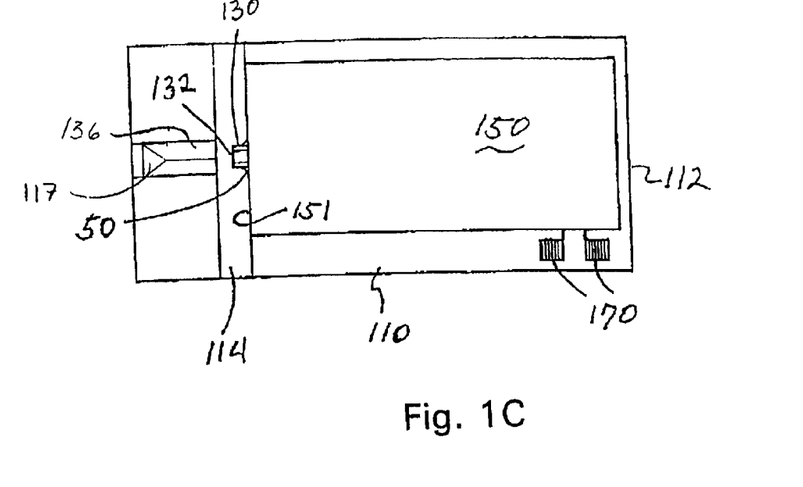
FIGS. 1C and 1D schematically illustrate top views of the optical microbench of FIG. 1A but with the optical fiber stub extending beyond the lid towards the beam deflector.
Figure 1D:
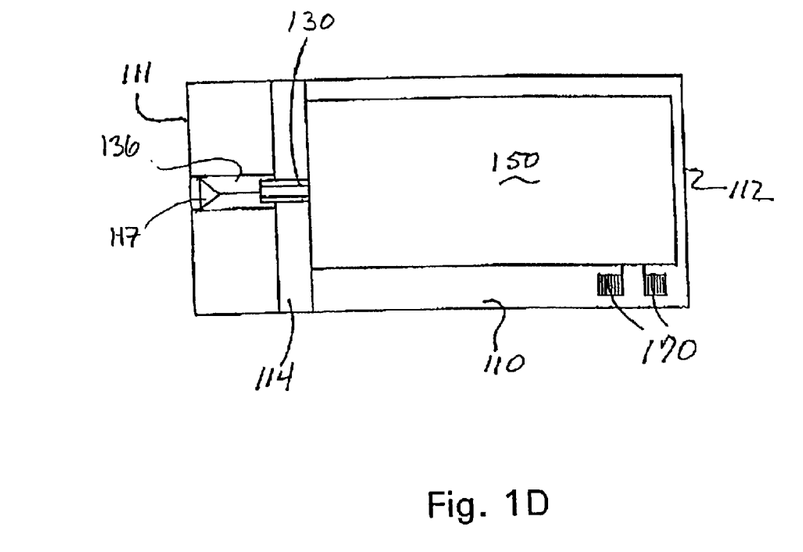
Figure 1E:
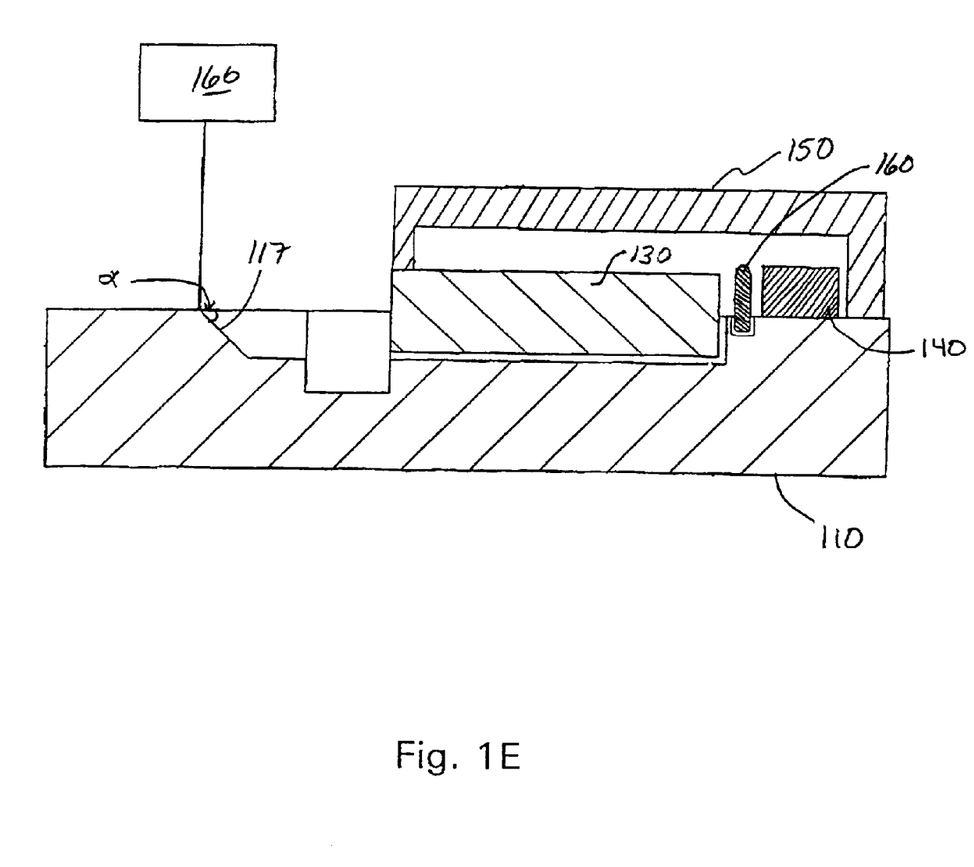
FIG. 1E schematically illustrates a side cross-sectional view of the microbench of FIG. 1A taken along the sectioning line E—E.
Figure 1F:
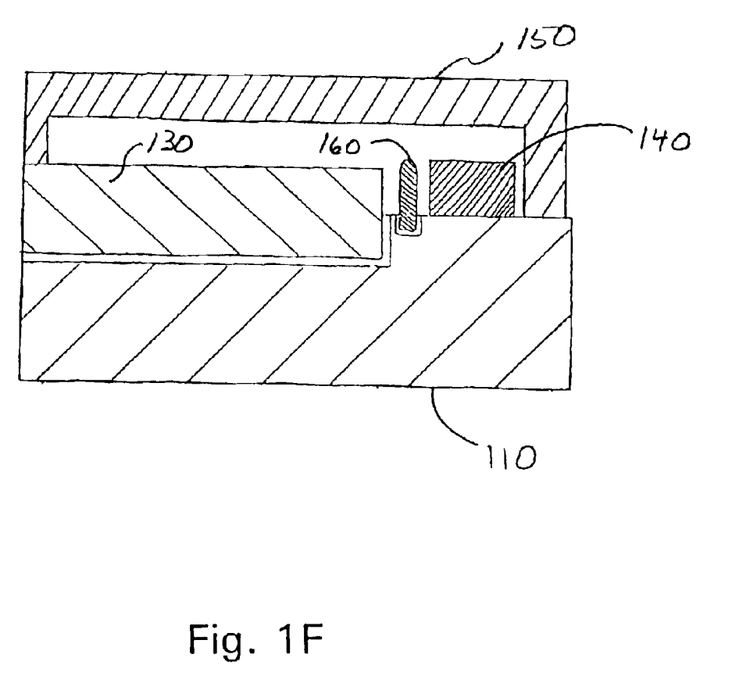
FIG. 1F schematically illustrates the side cross-sectional view of the microbench of FIG. 1E but with the optical device package singulated and the beam deflector removed.

The optical device package 106 also comprises an optical feed-through that permits an optical signal to travel between the optical semiconductor component 140 and the exterior of the optical device package 106. For example, the optical feed-through may comprise an optical fiber stub 130 disposed within a lower fiber groove 135 formed in the substrate 110. The lower fiber groove 135 may desirably be oriented relative to the optical semiconductor component 140 so that the longitudinal axis of the lower fiber groove 135 is parallel to the optical axis of the optical semiconductor component 140. The lower fiber groove 135 may be a V-groove having a V-shaped cross-sectional shape, a U-groove, or any other shape suited to supporting the optical fiber stub 130. The lower fiber groove 135 includes a first end 131 for communication with the exterior of the optical device package 106. The location of the first end 131 of the lower fiber groove 135 may be disposed proximate a lateral groove 114 in the substrate 110. The lateral groove 114 includes a sidewall 115 which may become an end wall 115 of the optical device package 106 when the optical device package 106 is singulated from the wafer 200, as illustrated in FIGS. 1E and 1F. The lower fiber groove 135 includes a second end interior to the optical device package 106 proximate the optical semiconductor component 140.

The lower fiber groove 135 has a length sufficient to support the optical fiber stub 130 within the lower fiber groove 135. For example, the lower fiber groove 135 may be sized to support a relatively short optical fiber stub 130 having a length generally ranging from about 1 mm to about 5 mm, although lengths outside of this range may also be employed when suitable. The optical fiber stub 130 may typically have a diameter of about 125 microns, for example. However, larger or smaller diameters may also be used when suitable. The lower fiber groove 135 has a depth sufficient to permit the optical fiber stub 130 to lie along the optical axis of the optical semiconductor component 140, so that an optical beam may communicate between the optical semiconductor component 140 and the exterior of the optical device package 106 via the optical fiber stub 130. For example, the depth of the lower fiber groove 135 may range from about 50 microns to about 500 microns. Optionally, a lens 160 may be provided between the optical fiber stub 130 in the optical semiconductor component 140 for coupling an optical beam between the optical fiber stub 130 and the optical semiconductor component 140. The lens 160 may be mounted in a cavity 117 recessed into the substrate 110.

The optical fiber stub 130 may be mounted within the lower fiber groove 135 so that a proximal end face 132 of the optical fiber stub 130 lies within the plane of the sidewall 115. Alternatively, the optical fiber stub 130 may extend into the lateral groove 114 to overhang the sidewall 115 to provide an optical device package with a protruding fiber stub 130, as shown in FIGS. 1C and 1D. The optical fiber stub 130 may desirably overhang the lateral groove 114 by about 50 microns to about 400 microns. The overhang of the optical fiber stub 130 decreases the possibility that the bonding agent 153 may wet the exposed proximal end face 132 of the optical fiber. Optionally, as shown in FIG. 1D, the optical fiber stub 130 may extend across the lateral groove 114 into a beam deflection groove 136.

The lid 150 may include a complementary groove 153 disposed in registration with a lower fiber groove 135 for retaining the optical fiber stub 130. The complementary groove 153 is provided at a selected location of the lid 150 so that when the lid 150 is joined to the substrate 110 the lower fiber groove 135 and the conjoined complementary groove 153 retain the optical fiber stub 130 therebetween. For example, for the configuration where the complementary groove 153 and the lower fiber groove 135 each have a V-shaped cross-section, the conjoined V-shaped grooves create channels having a diamond-shaped cross section, as depicted in FIG. 1A.

Alternatively, instead of an optical fiber stub 130, the optical feed-through may comprise a wall section of the lid 150 and/or the substrate 110 which are sufficiently transparent to the optical beam that is to travel between the optical semiconductor component 140 and the exterior of the optical device package 106. The wall section may be coated with a antireflection coating, such as silicon nitride, that is ¼ wavelength thick. As a further alternative, the optical feed-through may comprise an optical waveguide formed in the substrate 110 and/or the lid 150.

To facilitate the testing of the optical device package 106 while the optical device package 106 is attached to the wafer 200, the optical microbench 100 includes a beam deflector for directing the optical beam 190 out of the plane of the substrate 110 for optical communication with a testing device 160. As illustrated in FIGS. 1A–1D and 2, the beam deflector may be conveniently provided as an end wall 117 of a V-shaped beam deflection groove 136. The end wall 117 is disposed within the substrate 110 at a selected angle, $\alpha$, with respect to the upper surface 116, as shown in FIG. 1E. The angle of the end wall 117 is chosen so that an optical beam traveling along the optical axis of the optical fiber stub 130 is deflected by the end wall 117 along a direction that lies out of the plane of the substrate 110. For example, $\alpha$ may be between 20° and 70°, and may desirably be 45°. In particular, a may be 54.7° corresponding to the orientation of a {111} plane in anisotropically etched <100>-oriented single crystal silicon.

The optical beam 190 may be deflected by the end wall 117 by reflection off of the end wall 117. The substrate material may be selected so that the end wall 117 has a sufficient reflectivity, diffuse or specular, to cause a desired amount of deflection of the optical beam 190. Alternatively, or additionally, the end wall 117 may comprise one or more layers of a material that are reflective to the optical beam 190. For example, the end wall 117 may be coated with a metal layer. Further, the end wall 117 may be patterned to create a surface structure for deflecting the optical beam 190.

The optical device packages 106 may be singulated from the wafer 200 by dicing the wafer along the lateral grooves 114. For example, as illustrated in FIG. 1E, the substrate 110 may be diced along the sidewall 115 so that the portion of the substrate 110 comprising the lateral groove 114 and end wall 117 may be removed to yield the optical device package 106 as illustrated in FIG. 1F.

The substrate 110 and lid 150 may be fabricated from any material suitable for providing an optical microbench 100. The substrate and lid materials are chosen with regard to the features to be fabricated in the microbench 100 such as the lower fiber groove 135, end wall 117, and optional lateral groove 114. For example, one particularly suited material is single crystal silicon, which may be etched by an anisotropic processes to form the lower fiber groove 135 and end wall 117 of the beam deflection groove 136.

The crystallographic orientation of a single crystal substrate 110 may be chosen with respect to the desired orientation of the end wall 117 of the beam deflection groove 136. For example, <100>-oriented silicon may be selected and anisotropically etched to create the lower fiber groove 135 and the beam deflection groove 136 with end wall 117. The sidewalls of the lower fiber groove 135 and the beam deflection groove 136, including end wall 117, may comprise {111} crystallographic planes which are oriented at an angle, a, of 54.7° relative to the upper surface 116 of the substrate 110, as shown in FIG. 1E.

Alternatively, <110>-oriented silicon may be selected to create features, such as the lower fiber groove 135, having sidewalls that are perpendicular to the top surface of the substrate. In particular, a slot having a rectangular-shaped cross section may be formed by etching of <110>-oriented silicon through a rectangular mask with a solution of potassium hydroxide. In addition, other anisotropic crystalline materials, such as III–V semiconductor materials, e.g., InP, GaAs, InAs, or GaP, may be used in accordance with the present invention. Further suitable materials for the substrate 110 include, for example, ceramic, metal, glass, silicon dioxide, aluminum oxide, aluminum nitride, beryllium oxide, polymers, and aluminum.

In addition to etching processes, other milling processes, such as reactive ion etching (RIE), molding from a master, casting, stamping, electroforming, cutting with a dicing saw, or combinations of these, for example, may also be used to form the selected features of the substrate 110. For example, the lateral groove 114 may be formed by cutting the upper surface 116 of the substrate 110 with a dicing saw. The lower fiber groove 135 and the beam deflection groove 136 may be formed in the substrate 110 by creating a single continuous groove that comprises both the lower fiber groove 135 and the beam deflection groove 136. The single groove may be divided into the lower fiber groove 135 and the beam deflection groove 136 by providing the lateral groove 114 to transect the single continuous groove.

The pads 170 and leads 171 may be provided by coating the substrate 110 with a seed layer of metal, which is then coated with photoresist, patterned, and electroformed with a nickel plating bath to form the pads 170 and leads 171. Alternatively, a metal layer could be deposited on the substrate 110 using plating, evaporation, or sputtering. After depositing such a metal layer, the substrate 110 may then be coated with photoresist, which is patterned to cover the area where the pads 170 and leads 171 are to be provided, and the metal may then be etched from the areas not covered by the photoresist to form the pads 170 and leads 171. The photoresist may then be removed. As an alternative, the metal of the pads 170 and leads 171 may be evaporated or sputtered through a shadow mask. In addition, the ends 172 of the leads 171 and/or the pads 170 may be coated with a patterned solder. Alternatively, solder may be electroplated onto the ends 172 of the leads 171 and/or the pads 170.

In accordance with another aspect of the invention, a method is provided for testing an optical device package 106 while the optical device package 106 is attached to the wafer 200. In particular, the method of the present invention can provide efficient testing of a plurality of optical device packages 106 which are manufactured on a single wafer 200, as illustrated in FIG. 2.

Figure 4:
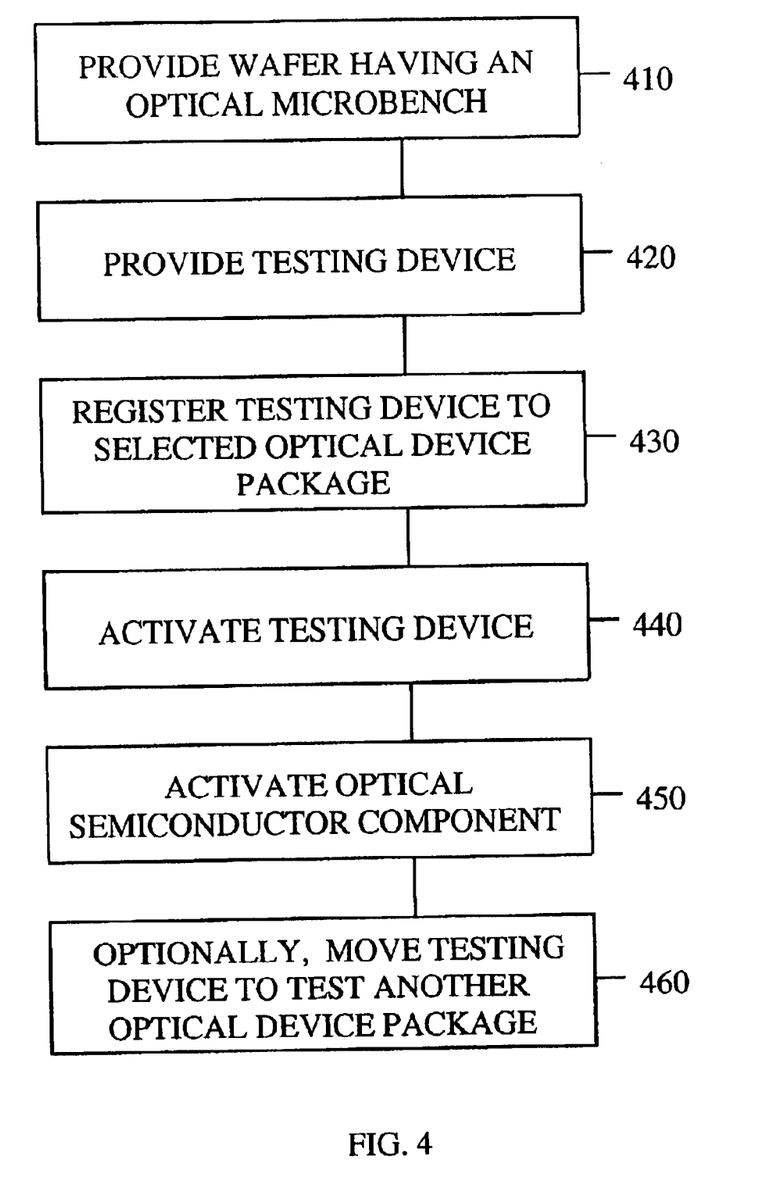
FIG. 4 illustrates a flowchart representing a process in accordance with the present invention for testing an optical microbench having an optical device package and a beam deflector.

Referring now to FIG. 4, there is shown a flowchart illustrating an exemplary method in accordance with the present invention for testing a plurality of optical device packages 106 attached to a wafer 200. The testing of the optical device packages 106 begins, at step 410 of FIG. 4, by providing a wafer 200 comprising a plurality of optical microbenches 100. The optical microbenches provided at step 410 each include an optical semiconductor component 140 mounted to the wafer 200. The optical semiconductor component 140 may include an optical source or a photodetector. The optical microbench 100 also includes a beam deflector 117 provided in the wafer and disposed along the optical path of the optical semiconductor component 140. The beam deflector 117 is configured to deflect a portion of the optical path to lie along a direction oriented out of the plane of the wafer 200. The optical microbench 100 further includes an optical feed-through 135 disposed along the optical path between the optical semiconductor component 140 and the beam deflector 117. The optical feed-through 135 is configured to conduct an optical signal between the beam deflector 117 and the optical semiconductor component 140. In certain applications, it may be desirable to test the optical device package 106 without the lid 150 in place, as illustrated in FIG. 2.

Having provided the wafer 200, a testing device 160 is provided at step 420. The testing device 160 may include an optical source or a photodetector. In particular, if the optical semiconductor component 140 includes an optical source, then the testing device 160 may include a photodetector. Conversely, if the optical semiconductor component 140 includes a photodetector, then the testing device 160 may include an optical source. The testing device 160 may include a single testing module or may include a plurality of testing modules. In one arrangement, the number of testing modules may equal the number of optical microbenches 100 provided on the substrate 200.

The testing device 160 is registered to a selected optical device package 106, at step 430, so that the testing device 160 is able to optically communicate with a selected optical semiconductor component 140 via the associated beam deflector 117. In the case where the testing device 160 includes a plurality of testing modules, each testing module may be simultaneously registered with a respective optical semiconductor component 140 of a respective optical device package 106.

Once the testing device 160 is registered to a selected optical device package 106, the testing device 160 and optical semiconductor component 140 may be activated, at steps 440 and 450, respectively. The testing device 160 and optical semiconductor component 140 may be activated simultaneously or sequentially in any order. In the case where the testing device 160 includes an optical source, the step of activating the testing device 160, step 440, includes the step of supplying electrical energy to the testing device 160 to cause the testing device 160 to emit an optical beam that is directed to the optical semiconductor component 140 by the beam deflector 117. In such a case, the step of activating the optical semiconductor component 140, step 450, includes the step of receiving the optical beam emitted from the testing device 160 and generating an electrical signal in response to the received optical beam. The electrical signal may indicate, for example, the coupling efficiency between the optical semiconductor component 140 and the optical fiber stub 130. The electrical energy supplied to the testing device 160 may include a high frequency electrical signal for testing the frequency response of the optical semiconductor component 140.

In the case where the optical semiconductor component 140 includes an optical source, the step of activating the optical semiconductor component 140, step 450, includes the step of supplying electrical energy to the optical semiconductor component 140 to cause the optical semiconductor component 140 to emit an optical beam that is directed to the testing device 160 by the beam deflector 117. In such a case, the step of activating the testing device 160, step 440, includes the step of receiving the optical beam emitted from the optical semiconductor component 140 and generating an electrical signal in response to the received optical beam. The electrical signal may indicate, for example, the coupling efficiency between the optical semiconductor component 140 and the optical fiber stub 130. The electrical energy supplied to the optical semiconductor component 140 may include a high frequency electrical signal for testing the high frequency behavior of the optical semiconductor component 140. By analyzing the electrical signal generated by the optical semiconductor component 140 or the testing device 160 the optical device package 106 is tested.

The method further includes the step of optionally moving the testing device 160 into registration with another optical device package 106, at step 460. Such an optional step may be performed when the optical testing device 160 includes fewer testing modules then there are optical device packages 106 on the wafer 200. After the testing device 160 is optionally moved, steps 440 and 450 may be repeated to test the optical device package 106 that is presently in registration with the testing device 160. Steps 440 through 460 may be repeated his many times is necessary to test each of the optical device packages 106 on the wafer 200.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. For example, while an optical semiconductor device has been provided in the optical device package, other optical devices, including a passive device such as a retroreflector may be used instead. In addition, further elements may be utilized in the optical device package such as a fiber amplifier, optical filter, modulator, grating, ball lens, or other components for conveying or modifying an optical beam. It should therefore be understood that this invention is not limited to the particular embodiments described herein, but is intended to include all changes and modifications that are within the scope and spirit of the invention as set forth in the claims.

What is claimed is:

1. An optical microbench device, comprising:
    an optoelectronic device mounted to a wafer having an upper surface, the optoelectronic device having an optical axis parallel to the wafer upper surface and having an optical path associated therewith for an optical signal to travel along to or from the optoelectronic device;
    a beam deflector disposed within the wafer along the optical path for deflecting
    the optical signal such that a portion of the optical path lies along a direction oriented out of the plane of the wafer upper surface; and
    an optical feed-through disposed along the optical path between the optoelectronic device and the beam deflector for conducting the optical signal between the beam deflector and the optoelectronic device.

2. The optical microbench device according to claim 1, wherein the optoelectronic device comprises an optical source.

3. The optical microbench device according to claim 1, wherein the optoelectronic device comprises a photodetector.

4. The optical microbench device according to claim 1, wherein the wafer comprises single crystal silicon.

5. The optical microbench device according to claim 1, wherein the optical feed-through comprises an optical fiber stub.

6. The optical microbench device according to claim 1, wherein the optical feed-through comprises a feed-through groove.

7. The optical microbench device according to claim 6, wherein the optical feed-through comprises an optical fiber stub disposed within the feed-through groove.

8. The optical microbench device according to claim 6, wherein the wafer comprises a single crystalline material and wherein the feed-through groove includes a sidewall comprising a {111} crystallographic plane of the wafer.

9. The optical microbench device according to claim 6, wherein the feed-through groove is disposed in a selected surface of the wafer.

10. The optical microbench device according to claim 1, wherein the beam deflector comprises a wall formed in a selected surface of the wafer.

11. The optical microbench device according to claim 10, wherein the wall is disposed at an angle with respect to an upper surface of the wafer.

12. The optical microbench device according to claim 10, wherein the wafer comprises a single crystalline material and wherein the wall comprises a {111} crystallographic plane of the wafer.

13. The optical microbench device according to claim 1, wherein the beam deflector comprises an end wall of a beam deflection groove formed in a selected surface of the wafer.

14. The optical microbench device according to claim 13, wherein the end wall is disposed at an angle with respect to an upper surface of the wafer.

15. The optical microbench device according to claim 13, wherein the wafer comprises a single crystalline material and wherein the end wall comprises a {111} crystallographic plane of the wafer.

16. The optical microbench device according to claim 13, wherein the optical feed-through comprises a feed-through groove.

17. The optical microbench device according to claim 16, wherein the longitudinal axis of the feed-through groove is disposed parallel to the longitudinal axis of the beam deflection groove.

18. The optical microbench device according to claim 16, wherein the longitudinal axis of the feed-through groove and the longitudinal axis of the beam deflection groove are colinear.

19. The optical microbench device according to claim 1, wherein the beam deflector comprises a layer of reflective material.

20. The optical microbench device according to claim 19, wherein the reflective layer comprises a metal.

21. The optical microbench device according to claim 1, wherein the optoelectronic device is disposed at a selected surface of the wafer which is recessed with respect to the upper surface of the wafer.

22. The optical microbench device according to claim 21, wherein the optical feed-through comprises a wall section formed in the wafer.

23. The optical microbench device according to claim 1, wherein the optical feed-through comprises a waveguide formed in the wafer.

24. The optical microbench device according to claim 1, comprising a lid mounted to the wafer for enclosing the optoelectronic device between the lid and the wafer.

25. The optical microbench device according to claim 24, wherein the optical feed-through comprises a wall section formed in the lid.

26. The optical microbench device according to claim 24, wherein the optical feed-through comprises a waveguide formed in the lid.

27. The optical microbench device according to claim 24, wherein the lid comprises a feed-through groove.

28. The optical microbench device according to claim 27, wherein the optical feed-through comprises an optical fiber stub disposed within the feed-through groove.

29. The optical microbench device according to claim 24, wherein the wafer comprises a single crystalline material and wherein the feed-through groove includes a sidewall comprising a {111} plane of the wafer.

30. The optical microbench device according to claim 1, wherein the optical component comprises at least one of an a laser, a LED, a photodiode, a fiber amplifier, an optical filter, an isolator, a modulator, a grating, and a lens.

31. A method for testing an optical microbench device, comprising the steps of:
 (a) providing a wafer comprising at least one optical subassembly, each subassembly comprising:
  an optoelectronic device mounted to the wafer, the optoelectronic device having an optical axis parallel to the wafer upper surface and having an optical path associated therewith for an optical signal to travel along to or from the optoelectronic device;
  a beam deflector disposed within the wafer along the optical path for
  deflecting a path of the optical signal such that the optical path lies along a direction oriented out of the plane of the wafer upper surface; and
  an optical feed-through disposed along the optical path between the optoelectroic device and the beam deflector for conducting the optical signal between the beam deflector and the optoelectronic device;
 (b) providing a testing device at selected location for optically communicating with the optoelectronic device via the beam deflector;
 (c) activating the optoelectronic device; and
 (d) activating the testing device to test the optoelectronic device.

32. The method for testing an optical microbench according to claim 31, wherein the optoelectronic device comprises an optical source and the testing device comprises a photodetector, and wherein the step of activating the optoelectronic device comprises the step of supplying electrical energy to the optoelectronic device to cause the optoelectronic device to emit an optical beam.

33. The method for testing an optical microbench according to claim 32, wherein the step of activating the testing device comprises the step of receiving the optical beam emitted from the optoelectronic device.

34. The method for testing an optical microbench according to claim 32, wherein the step of supplying electrical energy to the optoelectronic device comprises the step of providing a high frequency electrical signal to the optoelectronic device.

35. The method for testing an optical microbench according to claim 31, wherein the optoelectronic device comprises a photodetector and the testing device comprises an optical source, and wherein the step of activating the testing device comprises the step of supplying electrical energy to the testing device to cause the testing device to emit an optical beam.

36. The method for testing an optical microbench according to claim 35, wherein the step of activating the optoelectronic device comprises the step of receiving the optical beam emitted from the testing device.

37. The method for testing an optical microbench according to claim 35, wherein the step of supplying electrical energy to the testing device comprises the step of providing a high frequency electrical signal to the testing device.

38. The method for testing an optical microbench according to claim 31, wherein the wafer comprises a plurality of the optical subassemblies, and wherein the method comprises the steps of registering the testing device relative to a first subassembly and subsequently registering the testing device to a second subassembly for testing the first and second subassemblies.

39. The method for testing an optical microbench according to claim 31, wherein the wafer comprises a plurality of the optical subassemblies and the testing device comprises a plurality of testing modules, each module registered to optically communicate with a respective optical subassembly.

40. An optical microbench device comprising:
 an optoelectronic device mounted to a wafer having an upper surface, the optoelectronic device having an optical path associated therewith for an optical signal to travel along to or from the optoelectronic device;
 a beam deflector disposed within the wafer along the optical path for deflecting the optical signal such that a portion of the optical path lies along a direction oriented out of the plane of the wafer;
 an optical feed-through disposed along the optical path between the optoelectronic device and the beam deflector for conducting the optical signal between the beam deflector and the optoelectronic device; and
 a hermetic enclosure for hermetically enclosing the optoelectronic device, wherein the optical feed-through forms in part the hermetic enclosure.

* * * * *